UNITED STATES PATENT OFFICE.

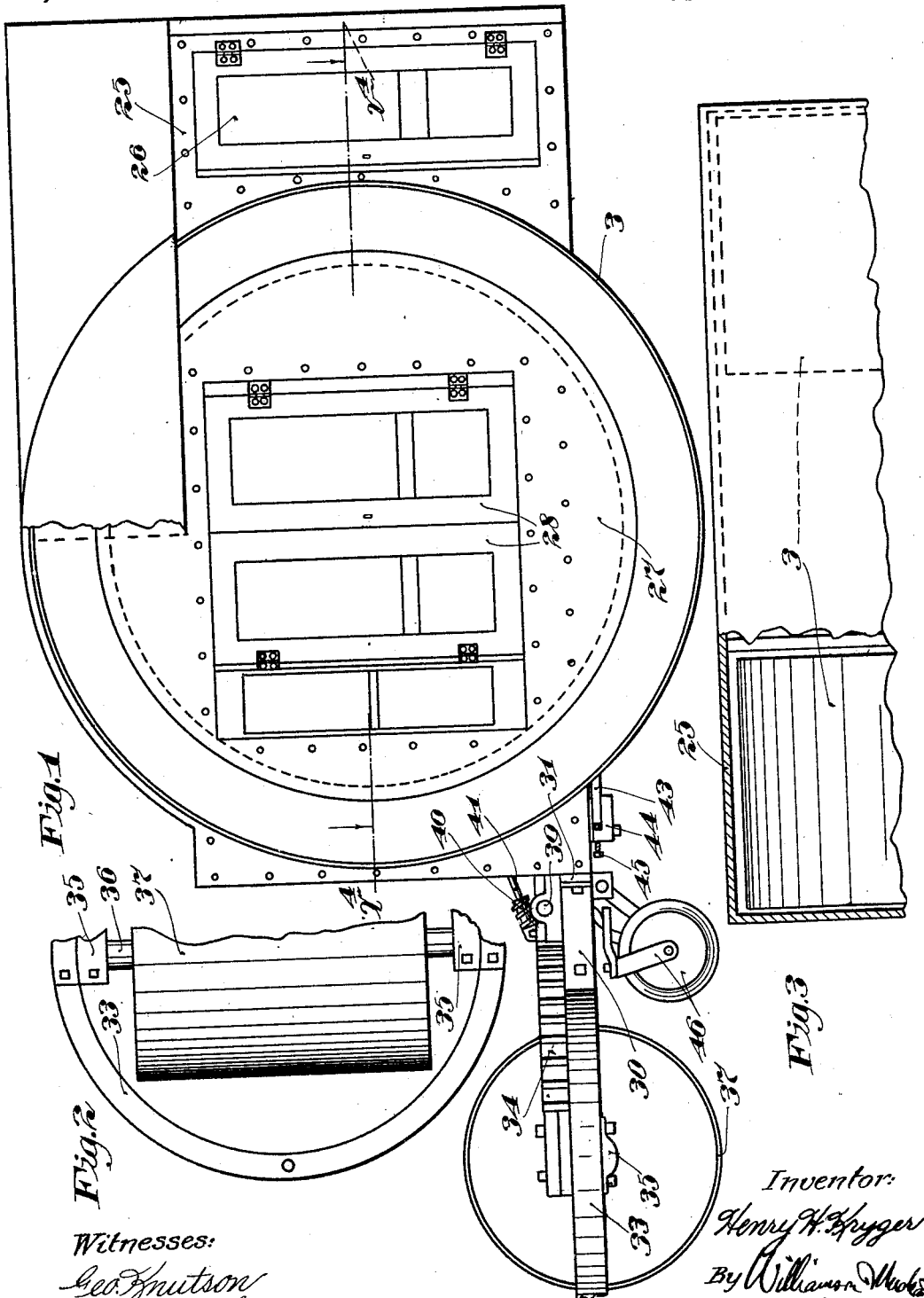

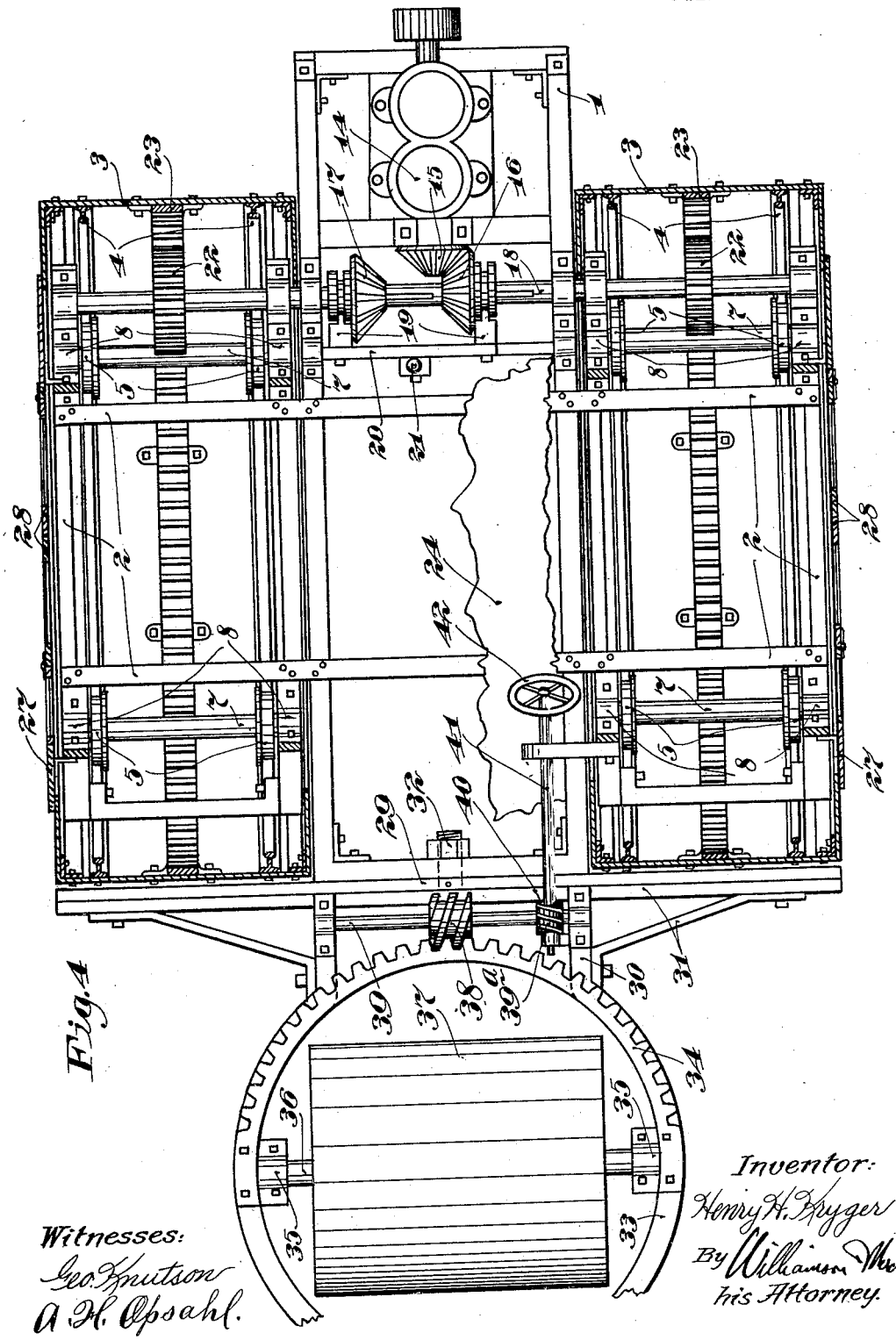

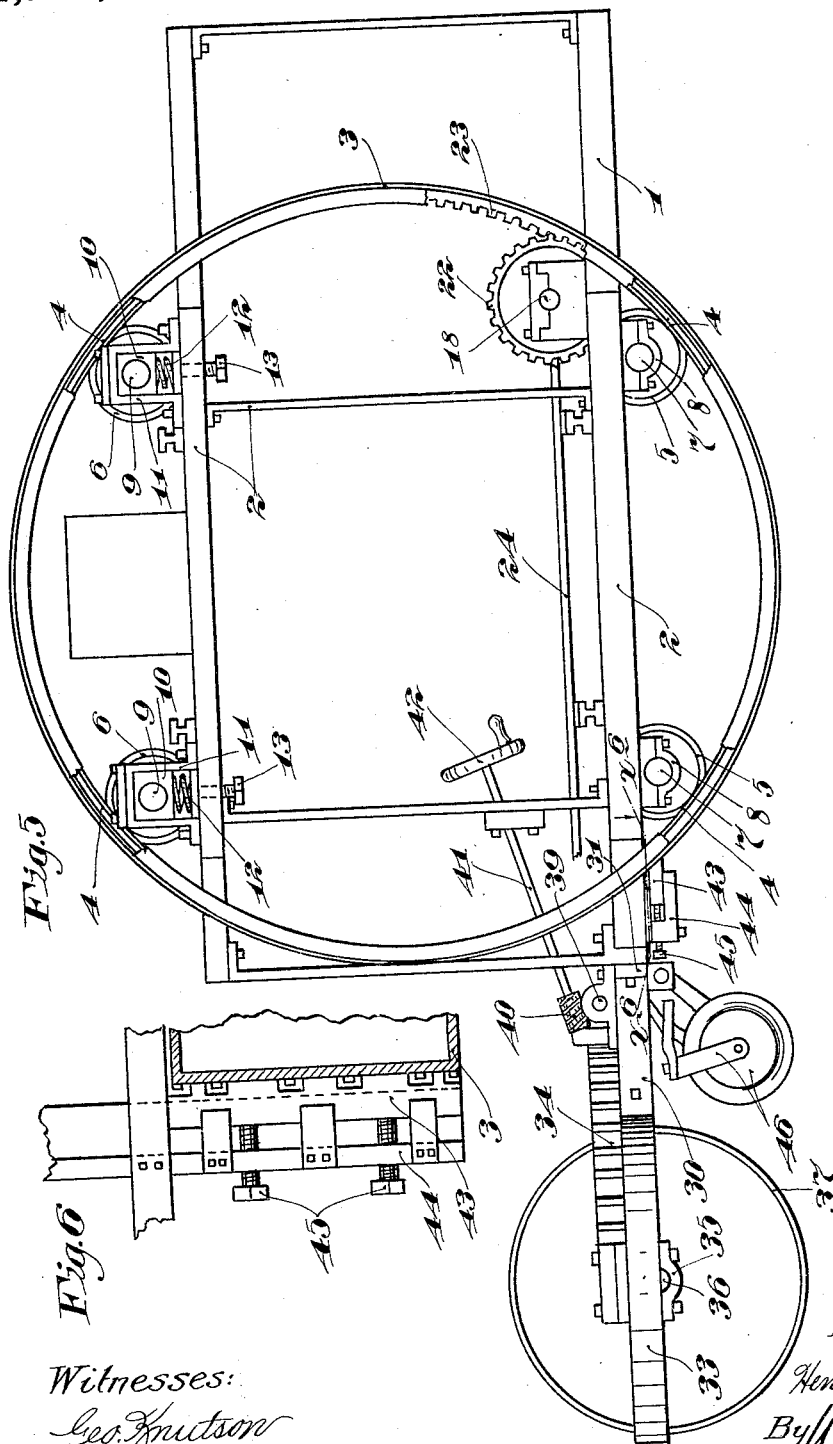

HENRY H. KRYGER, OF MINNEAPOLIS, MINNESOTA.

TRACTION-ENGINE.

1,120,945.  Specification of Letters Patent.  Patented Dec. 15, 1914.

Application filed January 11, 1913. Serial No. 741,480.

*To all whom it may concern:*

Be it known that I, HENRY H. KRYGER, a citizen of the United States, residing at Minneapolis, in the county of Hennepin and State of Minnesota, have invented certain new and useful Improvements in Traction-Engines; and I do hereby declare the following to be a full, clear, and exact description of the invention, such as will enable others skilled in the art to which it appertains to make and use the same.

My invention has for its object to provide an improved traction engine; and to such ends, generally stated, the invention consists of the novel devices and combinations of devices hereinafter described and defined in the claims.

Particularly, this invention is directed to the improvement in very large and heavy traction engines and it includes as its salient novel feature, very large traction wheels arranged to serve as housings or parts of a cab, and a suitable framework having platform supporting trusses or skeletons with guide wheels on which the traction wheels proper are arranged to rotate. The traction wheels are thus not only to serve as housings or cab compartments, but they inclose and protect from dirt, rain, snow, and the other elements, the bearings and driving gears which collect on the framework of the traction wheels.

The preferred embodiment of the invention is illustrated in the accompanying drawings wherein like characters indicate like parts throughout the several views.

Referring to the drawings, Figure 1 is a side elevation, some parts broken away, showing a traction engine designed in accordance with my invention; Fig. 2 is a fragmentary view of the rear steering wheel of the traction engine; Fig. 3 is a front elevation with some parts sectioned and with some parts broken away, showing chiefly the cab structure of the traction engine or tractor; Fig. 4 is a horizontal section taken approximately on the line $x^4$ $x^4$ on Fig. 1; Fig. 5 is a view in side elevation with some parts broken away and with parts removed showing the framework or skeleton of the tractor; and Fig. 6 is a detail in horizontal section taken approximately on the line $x^6$ $x^6$ on Fig. 5.

The framework of the machine comprises a rectangular skeleton 1 provided at its sides with rectangular projections or supplemental frame extensions 2 that are surrounded by very large and very wide annular or hubless traction wheels 3 that are channel-shaped in cross-section. These channel-shaped traction wheels 3 are provided with annular internal rails 4 that run on flanged lower guide wheels 5 and similar flanged upper guide wheels 6. The lower guide wheels 5 are shown as secured to axles 7 journaled in suitable bearings 8 fixed on the lower portions of the frame extensions 2. The upper wheels 6 are secured to axles 9 journaled in bearings 10 that are mounted for limited vertical movements in keeper brackets 11 rigidly secured on the upper portions of the said frame extensions 2. Coiled springs 12 that are subject to adjusting screws 13, yieldingly press the bearings 10, and hence the upper wheels 6, upward as far as they will go and thus take up all play between the upper wheels 6 and the internal annular rails 4 of the said traction wheels 3. The said traction wheels are thus each mounted to rotate around or upon a set of eight guide wheels, which guide wheels, complete, afford the journal for the said traction wheel. The tractor may be driven either by an explosive engine or by a steam engine, but is preferably driven by the former, the said explosive engine which is herein indicated as an entirety by the numeral 14, being suitably mounted on the forwardly projecting end of the main frame 1. The crank shaft of this engine is shown as provided with a beveled gear 15 that is adapted to be engaged by either of two opposite beveled gears 16 and 17 that are keyed for rotation with, but mounted for sliding movements upon a transverse guide shaft 18 journaled in suitable bearings on the main frame 1 and its supplemental or lateral extensions 2. The beveled gears 16 and 17 are shown as provided with groove hubs engaged by shipper heads 19 secured to a shipper bar 20 adapted to be moved by a lever 21 (see Fig. 4). Within each annular traction wheel 3, the counter shaft 18 is provided with a spur pinion 22 that meshes with a very large internal ring gear 23 secured to the shell of the said traction wheel, preferably, at the transverse center thereof and midway between the two laterally spaced annular rails 4.

An operator's platform 24 is extended on the lower portion of the main frame 1 and on the lower portions of the lateral extensions 2, so that the operator may walk freely between the two traction wheels and into and out of either of the said traction wheels. The main frame 1 is preferably provided with a housing 25 which serves as a main cab compartment, and, as shown, is provided with an entrance door 26 (see Figs. 1 and 3). The inner faces of the traction wheels 3 are left with the large annular openings adjacent to the housing or main cab structure 25, but the large annular openings in the outer sides of the said traction wheels are preferably closed by large disk-like housing plates 27, bolted or otherwise rigidly secured to the outer end portions of the frame extensions 2. These housing plates 27 are shown as provided with hinged doors 28 which, when opened, afford access to the interior of the traction wheels and which are preferably glazed so that when closed, the cab compartments within the traction wheels will be made light. Bolted, or otherwise rigidly secured to the rear end portion of the main frame 1, and projecting laterally therefrom, approximately to the outer faces of the traction wheels 3, is a bolster 29.

The numeral 30 indicates an auxiliary rear truck frame, which, at its front portion, is provided with a trussed and laterally projecting bolster 31 that is centrally pivoted to the bolster 29 and rear end portion of the main frame 1, as shown, by a coupling bolt 32 (see Fig. 4). This auxiliary truck frame 30 is provided with a horizontal bearing ring 33 on which a segmental gear 34 is arranged to move pivotally on the axis of the said ring 33. This segmental gear 34 is provided with bearings 35 on which the spindle 36 of a wide faced steering wheel or roller 37 is journaled. The segmental gear 34 meshes with a worm 38 secured to a short transverse shaft 39 journaled in suitable bearings on the said auxiliary frame 30 and provided near one end with a worm gear 39ᵃ that meshes with a worm 40 on the lower end of a steering post 41. The said steering post 41 is mounted in suitable bearings on the main frame 1 and at its upper end, is provided with the usual end wheel 42 (see Figs. 4 and 5).

The swivel or pivotal connection between the main truck frame and the auxiliary rear truck frame, provided at 32, permits the large and heavy main traction wheels to adapt themselves to all irregularities of the ground while permitting the wide faced and heavy rear or steering wheel 37, likewise to independently adapt itself to irregularities in the surface of the ground. This, as is evident, relieves the framework of the machine from undue strains which would be put thereon with a more rigid or inflexible frame structure.

Preferably, scrapers are provided for keeping the outer faces of the main traction wheels 3 free from accumulation of dirt or mud. To this end, scraper blades 43 (see Figs. 5 and 6) are mounted in suitable keepers 44, formed as extensions of the rear lower bars of the main frame 1. These scraper blades 43 are, as shown, pressed forward by set screws 45 working through flanges on the said keepers 44. Inasmuch as the faces of the wheels 3 will usually have projecting bolt heads or nuts, the working edges of the scrapers 43 are notched to clear the same, as clearly shown in Fig. 6.

The traction engine of this character is adapted for use for a great many different purposes. It may, for instance, be used to haul a gang of plows, a gang of seeders, or a gang of disk drills. In Figs. 1 and 5, disk drills indicated as entireties by the numeral 46 are shown as attached to the bolster 31 of the rear auxiliary truck frame.

With the above described arrangement, the use of traction wheels of very great diameter, say ten feet or more, is made practical. These large traction wheels, with their wide faces will, of course, roll very easily over soft and rough ground, such as plowed ground, for instance. By the direct application of the driving power to the front portions thereof, there is little loss of friction in the transmission and a material gain in effective driving power. The driving gears being incased or housed in, are protected from dirt, and hence will run or wear very much longer than exposed gears such as usually employed. All of the above features contribute to make a very highly efficient and very powerful tractor.

What I claim is:

1. In a tractor, the combination with a framework having lateral projections with circumferentially spaced pairs of inner and outer guide wheels mounted thereon, of annular wheels having laterally spaced pairs of internal rails mounted on said guide wheels, whereby the said guide wheels afford journals for said annular wheels.

2. In a tractor, the combination with a framework having lateral projections with circumferentially spaced pairs of inner and outer guide wheels mounted thereon, of annular wheels having laterally spaced pairs of internal rails mounted on said guide wheels, whereby the said guide wheels afford journals for said annular wheels, and non-rotary housing plates applied to the lateral extensions of said framework and tightly closing the outer sides of said annular wheels.

3. In a tractor, the combination with a framework having lateral projections with circumferentially spaced guide wheels mounted thereon, of annular traction wheels mounted on said guide wheels, the said framework having a platform extended into the said traction wheels, and housing plates applied to the frame extensions and closing the outer sides of the said traction wheels.

4. In a tractor, the combination with a framework having lateral projections with circumferentially spaced guide wheels mounted thereon, of annular traction wheels mounted on said guide wheels, internal ring gears applied to the interiors of said annular traction wheels, and engine driven pinions meshing with said ring gears.

5. In a tractor, the combination with a framework having lateral projections with circumferentially spaced guide wheels mounted thereon, of annular traction wheels mounted on said guide wheels, internal ring gears applied to the interiors of said annular traction wheels, a transverse counter shaft mounted on said framework and having pinions meshing with said ring gears, an engine on said frame and a reversible drive connecting said engine to said counter shaft.

6. The combination with a framework having lateral skeleton projections, of four pairs of laterally spaced flanged guide wheels journaled on each lateral projection of said framework, and a pair of annular traction wheels having laterally spaced internal rails running on the said flanged guide wheels.

7. The combination with a framework having lateral skeleton projections, of four pairs of laterally spaced flanged guide wheels journaled on each lateral projection of said framework, and a pair of annular traction wheels having laterally spaced internal rails running on said flanged guide wheels, the upper members of said guide wheels being yieldingly pressed upward.

8. The combination with a framework having lateral skeleton projections, of four pairs of laterally spaced flanged guide wheels journaled on each lateral projection of said framework, and a pair of annular traction wheels having laterally spaced internal rails running on the said flanged guide wheels, internal ring gears secured to the interiors of said annular traction wheels between the endless rails thereof, and a transverse engine driven counter shaft mounted on said framework and provided with spur pinions meshing with said ring gears for driving said traction wheels.

9. The combination with a framework having lateral skeleton projections, of four pairs of laterally spaced flanged guide wheels journaled on each lateral projection of said framework, and a pair of annular traction wheels having laterally spaced internal rails running on the said flanged guide wheels, said framework having a platform with projections extended into said annular traction wheels.

10. The combination with a framework having lateral skeleton projections, of four pairs of laterally spaced flanged guide wheels journaled on each lateral projection of said framework, and a pair of annular traction wheels having laterally spaced internal rails running on the said flanged guide wheels, said framework having a platform with projections extended into said annular traction wheels, and door equipped housing plates applied to the said frame extensions and closing the outer sides of said annular traction wheels.

11. In a tractor, the combination with a framework having lateral projections with circumferentially spaced guide wheels mounted thereon, of annular traction wheels mounted on said guide wheels, and a supplemental truck frame swiveled to the rear portion of said main frame and provided with a steering wheel.

12. The combination with a framework having lateral skeleton projections, of four pairs of laterally spaced flanged guide wheels journaled on each lateral projection of said framework, a pair of annular traction wheels having laterally spaced internal rails running on the said flanged guide wheels, and a supplemental truck frame swiveled to the rear end portion of said main frame, a wheel support pivotally mounted on said rear supplemental truck frame, a wheel journaled to said support, and means for moving said wheel support to steer the tractor.

13. The combination with a framework having lateral skeleton projections, of four pairs of laterally spaced flanged guide wheels journaled on each lateral projection of said framework, a pair of annular traction wheels having laterally spaced internal rails running on the said flanged guide wheels, and a supplemental truck frame swiveled to the rear end portion of said main frame, a wheel support pivotally mounted on said rear supplemental truck frame, a wheel journaled to said support, and means for moving said wheel support to steer the tractor, said main frame having a cab housing between said traction wheels.

14. The combination with a framework having lateral skeleton projections, of four pairs of laterally spaced flanged guide wheels journaled on each lateral projection of said framework, a pair of annular traction wheels having laterally spaced internal rails running on the said flanged guide wheels, and a supplemental truck frame swiveled to the rear end portion of said main frame, a wheel support pivotally mounted on said rear supplemental truck frame, a wheel journaled to said support, means for moving said wheel support to steer the tractor, said main frame having a cab housing between said traction wheels, and the extensions of said framework having door-equipped housing plates closing the outer sides of said annular traction wheels and provided also with a platform extended into said traction wheels.

In testimony whereof I affix my signature in presence of two witnesses.

HENRY H. KRYGER.

Witnesses:
HARRY D. KILGORE,
F. D. MERCHANT.